United States Patent [19]
Lo

[11] Patent Number: 5,293,642
[45] Date of Patent: Mar. 8, 1994

[54] METHOD OF LOCATING A MOBILE STATION

[75] Inventor: Wing F. Lo, Plano, Tex.

[73] Assignee: Northern Telecom Limited, Montreal, Canada

[21] Appl. No.: 630,010

[22] Filed: Dec. 19, 1990

[51] Int. Cl.$^5$ ............................................. H04Q 7/00
[52] U.S. Cl. ................... 455/33.1; 455/33.4; 455/56.1; 455/67.1; 342/457
[58] Field of Search ............... 455/33.1, 33.4, 56.1, 455/33.2, 62, 67.1, 67.6; 342/357, 463, 457, 465; 375/1

[56] References Cited

U.S. PATENT DOCUMENTS

| | | | |
|---|---|---|---|
| 4,718,081 | 1/1988 | Brenig | 455/33.4 |
| 4,728,959 | 3/1988 | Maloney et al. | 342/465 |
| 4,891,650 | 1/1990 | Scheffer | 342/457 |
| 4,916,455 | 4/1990 | Bent et al. | 342/457 |
| 5,166,694 | 11/1992 | Russell et al. | 342/457 |

Primary Examiner—Reinhard J. Eisensopf
Assistant Examiner—Andrew Faile
Attorney, Agent, or Firm—Foley & Lardner

[57] ABSTRACT

A method of providing an estimation of a mobile station's location in a cellular communication system having a plurality of base stations and mobile stations is disclosed. The mobile station's location is provided by measuring radio propagation parameters between the mobile station and each base station within propagation range of the mobile station. Then, a location probability density function (pdf) is found based on the measured radio propagation parameters. A joint probability density function (pdf) is then constructed by combining each individual function which is obtained. The location of the mobile station is then estimated from the resulting joint probability density function (pdf).

14 Claims, 6 Drawing Sheets

METHOD OF LOCATING A MOBILE STATION

FIELD OF THE INVENTION

The present invention relates to cellular communication services, but more particularly, to a method of locating a mobile station within a cellular system using the radio propagation information available to the system for normal cellular operation.

BACKGROUND OF THE INVENTION

In a cellular radio system, the served area is divided into cells. Each cell is served by one base station. An active mobile station in a cell remains in radio contact with the serving base station. In normal operation, when a mobile engaged in active conversation moves from one cell to another, the cellular system will perform a hand-off in which the mobile station is instructed to tune to a new channel served by the base station of the cell it is entering.

In order to provide more efficient hand-offs and traffic management, a cellular system needs to know the approximate location of all the mobile stations engaged in active calls. In addition, a cellular system may also provide a mobile station location service. This service can provide information on the location of mobile station to the authorized service subscriber, even if the mobile is not engaged in an active call.

DESCRIPTION OF THE PRIOR ART

A cellular system requires a mobile station's location primarily for hand-off and other traffic management purposes. As a mobile station traverses the cell boundaries, it is handed off from one cell into another. In North American analog cellular systems, once a mobile's transmitted signal is perceived as weak at the base station currently serving the call, the serving base station will send measurement requests to neighboring cells asking for the received signal strength indication (RSSI) of the mobile's signal at these neighboring cell sites. If the serving base station does not have the strongest RSSI, the system will select the cell with the strongest RSSI as the hand-off target cell, that is, the next cell to serve the mobile station.

In a North American dual mode digital cellular system, all mobile stations are to be equipped with Mobile Assisted Hand-Off (MAHO) capability. A dual mode mobile station when tuned to a Digital Traffic Channel has the capability of measuring and reporting the RSSI of the current digital traffic channel and up to 12 other channels specified by a command from the base station. When MAHO is activated, a mobile station may be commanded to periodically measure and report the RSSI of the signal transmitted from the serving base station plus the RSSI of signals from up to twelve other neighboring base stations. The serving base station may use the MAHO-reported RSSI in the base to mobile direction together with the RSSI of mobile to base signal measured in surrounding base stations to make hand-off decisions.

Traditional hand-off target cell selection is based on a comparison of RSSI at different cells and selection of the cell with the highest signal strength. However, such simple selection algorithms suffer from lack of accuracy due to the fluctuations of signal strength from shadowing losses and multi-path fading. Suboptimal target cells are often selected, resulting in further unnecessary hand-offs soon thereafter.

Means other than the RSSI have also been considered for estimating the distance from a mobile station to a base station. The supervisory audio tone (SAT) in an analog mobile system was originally conceived to provide location measurement based on the phase of the transponded signal. This however, was found to be not sufficiently accurate, and range information alone, without directional azimuth, is of little value for hand-off purposes.

SUMMARY OF THE INVENTION

The current invention provides a mobile station location estimation by optimally combining the location estimation of the mobile station from the base stations of the surrounding cells. The result is a maximum likelihood estimation of the mobile location given the mobile location estimation from individual surrounding base stations. Such location information may be used as a factor in hand-off decision making or be the source of data supplied to subscribers of a mobile station location service.

In this invention, radio propagation information for normal cellular operation between a mobile station and a base station within each other's range is used to form a two-dimensional location probability density function (location pdf). This location pdf describes how likely the mobile station is to be found at a particular coordinate given the radio information obtained between the mobile and the particular base station. One location pdf is formed between a mobile station and each nearby base station. These individual location pdf's are combined into a joint location probability density function which describes the likelihood of the particular mobile station to be found in the service area.

The radio information used to form the individual density functions may include, but is not limited to, the radio path attenuation, radio propagation delay and base station antenna radiation pattern. The pdf may be found by means of well known radio signal strength measurement techniques using a vehicle mounted test transmitter, or by theoretical models of propagation or by a combination of the two methods.

Accordingly, an aspect of the present invention is to provide in a cellular communication system having a plurality of base stations and mobile stations, a method of providing an estimation of a mobile station's location, comprising the steps of:
a) measuring radio propagation parameters between a mobile station and each base station within propagation range of the mobile station;
b) forming a location probability density function based on the measured radio propagation parameters in (a);
c) constructing a joint probability density function by combining each individual function obtained in (b); and
d) estimating the location of the mobile station from the resulting joint probability density function.

DESCRIPTION OF THE PREFERRED EMBODIMENT

Figure 1:
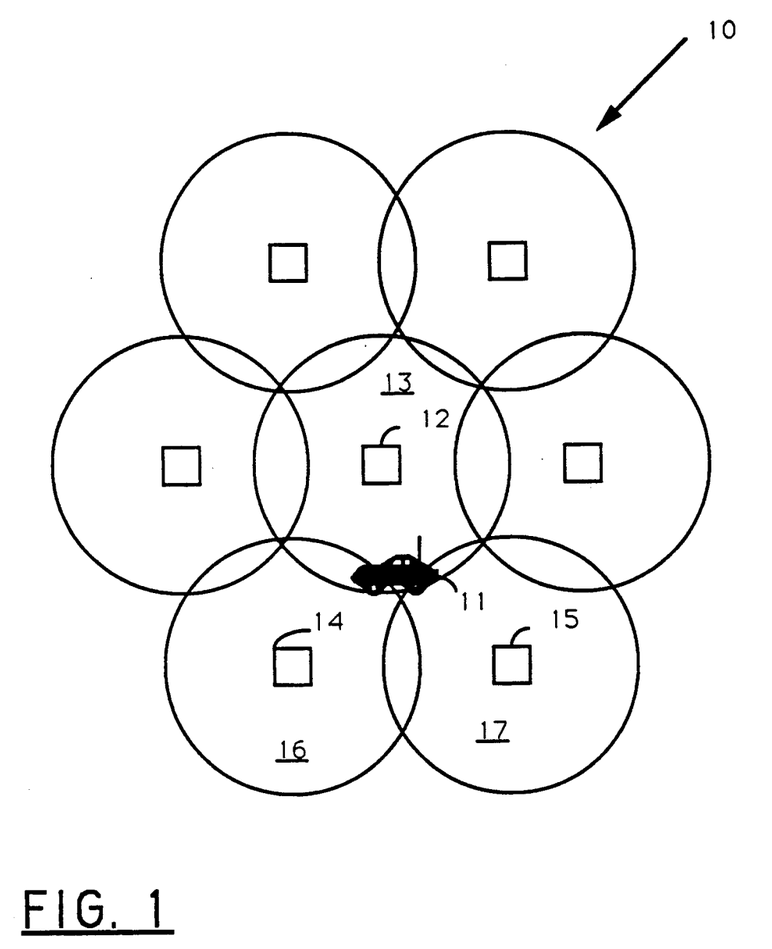
FIG. 1 illustrates a typical cluster of cells in a cellular communication system.

Referring now to FIG. 1, we have shown a typical cell cluster 10 forming part of a larger cellular network (not shown). This particular cluster is commonly known as a 7 cell pattern. Other patterns such as the 120 degree segmented cells and tiered omni-directional cells (not shown) can also be used, but need not be discussed herein. In this example, a mobile station 11 is being served by base station 12 of cell 13. Base stations 14 and 15 of cells 16 and 17 respectively, are also within radio range of mobile station 11.

As the mobile station 11 travels, a request for signal strength measurements will be sent by the serving base station 12 to neighboring cells. If the strongest Received Signal Strength Indication (RSSI) is received from a neighboring base station, the serving base station 12 will select that neighboring base station as the hand-off target base station, i.e. the next base station to serve the mobile station. However, as indicated above, this simple selection of cells can be inaccurate, due to fluctuations of signal strength. For example, as mobile station 11 travels at the intersection of cells 13, 16 and 17, it may be possible that the RSSI measurement is greater in cell 17, even though the mobile station 11 is travelling into cell 16. Accordingly, serving base station 12 could unnecessarily hand off the call to base station 15, since the instantaneous RSSI measurement is greater in that cell. However, as the mobile station moves further into cell 16, a further hand off will be required.

As indicated above, the current invention involves combining the location estimation of a mobile station from multiple base stations surrounding the mobile station in an optimal manner to estimate the mobile's location. The location estimation process requires the following three steps:

a) base stations 12, 14 and 15 within radio propagation range of mobile 11, form a two-dimensional location probability density function of the mobile's location;

b) a joint probability density function is formed by combining the individual probability density functions obtained in step (a); and c) an estimation the mobile station location is obtained from the resulting joint probability density function.

The two-dimensional location probability function for a mobile station and a base station within each other's radio range can be obtained at the base station by using one or more of the following radio parameters to establish a two-dimensional location probability density function (location pdf):

Radio attenuation from RSSI measurements at the mobile station;

Radio attenuation from RSSI measurements at the base stations;

Direction of signal arrival at the base station;

Radio propagation delay from mobile signal arriving at the base station; and

Mobile transmission timing alignment.

Figure 2:
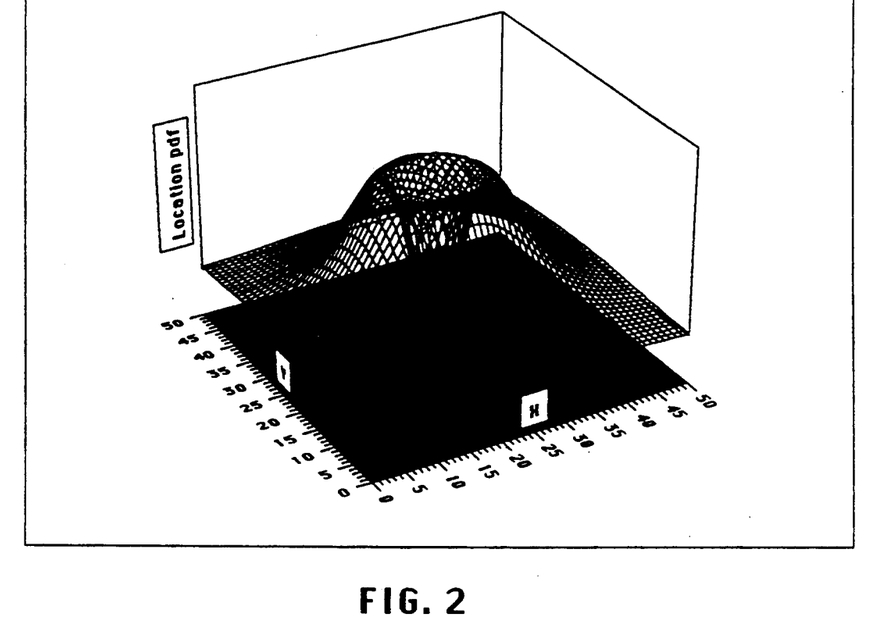
FIG. 2 illustrates an example of a location pdf function from one base station.

FIG. 2 shows an example of a location pdf u(x,y) from one base station. The x, and y axes represents the two dimensions of a geographical area. The z dimension represents the location probability density, that is, the probability density of finding the mobile station at geographical coordinate (x,y).

The individual location pdf can be established based on different radio parameters. General methods of constructing the probability density function are based on received signal strength, direction of signal arrival at the base station and radio propagation.

The Probability Density Function (pdf) based on Signal Strength can be derived as follows:

Cellular band signal propagation loosely follows the inverse power law of:

$$S = kpr^{-\gamma} \qquad (1)$$

where s is the received power;

p is the transmission power;

r is the distance between the transmitter and the receiver;

$\gamma$ is the propagation constant ranging from 2 to 4.5 depending on propagation environment (this is an empirically chosen value which best fits measured data in the range of interest); and k is the proportional constant.

In the ideal homogeneous environment which follows the inverse power law, the probability density function of a mobile station relative to an omni-directional base station, given the transmitter power (p) and the RSSI (s), is a radially symmetrical function $u_o(r,\theta)$ with a value of zero for all distances r either greater or smaller than $r_o$, where $r_o$ is given by $s_o = kp_o r_o^{-\gamma}$, in which $p_o$ is the actual mobile transmit power and $s_o$ is the measured receive power at the base receiver. At $r = r_o$, the function $u_o(r_o, \theta)$ has a value of infinite such that $$\int_A u_o(r,\theta)\, dr\, d\theta = 1$$

where A is an area which circumscribes the circle of $r = r_o$.

Taking into account the statistical variation of signal power due to shadow losses and multi-path fading, the circle will smear out to become a volcano shaped function similar to that shown in FIG. 2.

This volcano shaped function $u_i(x,y)$ is the two dimensional probability density function of finding the mobile station at coordinate (x,y) due to the RSSI from the ith base station with the ith base station located at the center of the volcano.

Figure 3:
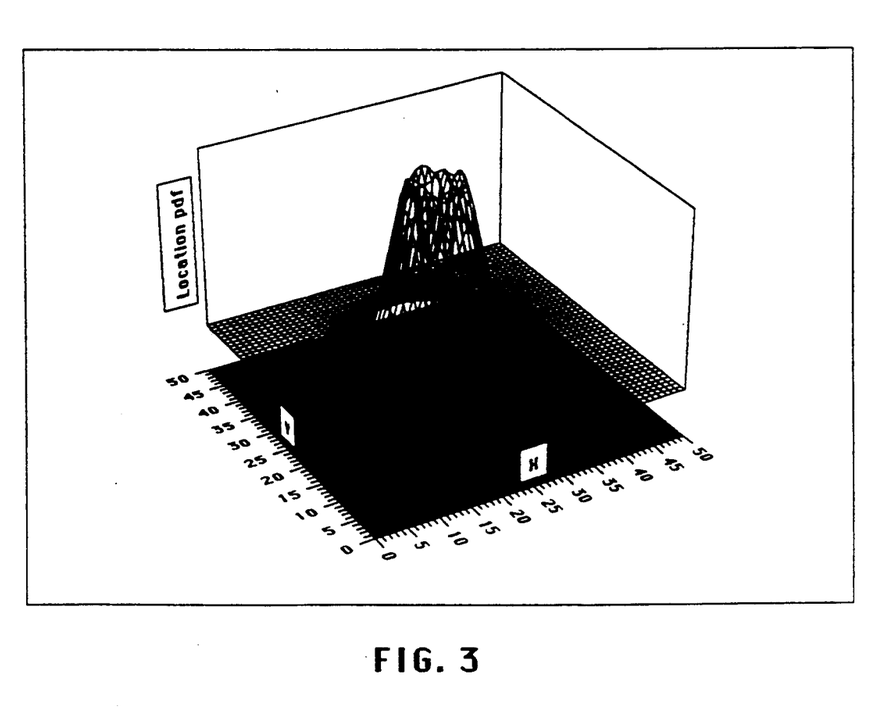
FIG. 3 illustrates a location pdf obtained from one base station with a high RSSI.
Figure 4:
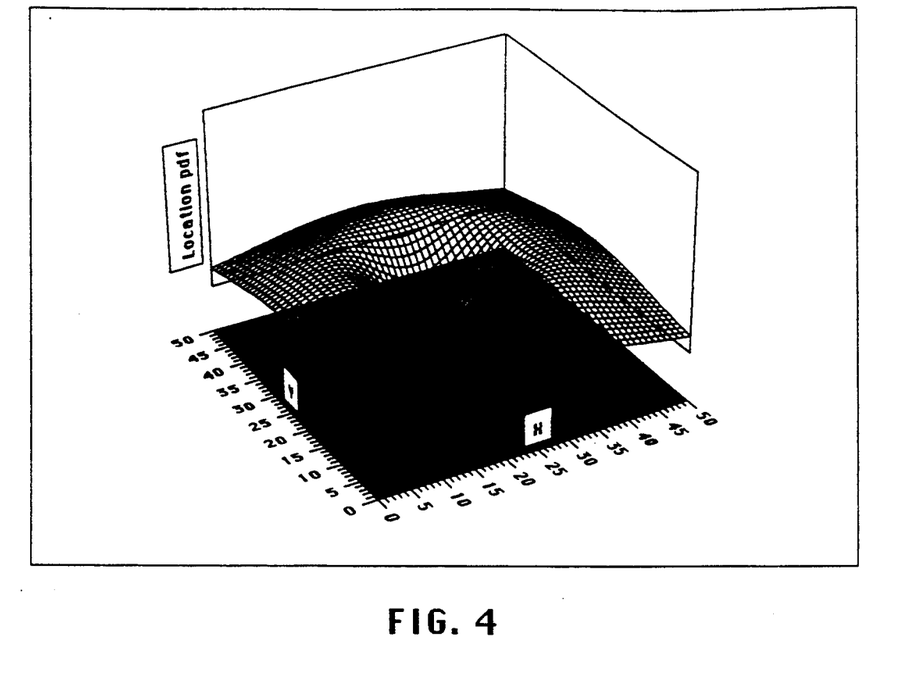
FIG. 4 illustrates a location pdf obtained from one base station with a low RSSI.

A cross section of the volcano shows the bell-shaped one dimensional density function. A high RSSI brings the peaks closer to the base station and increases the height of the peaks (FIG. 3). This implies the mobile is much more likely to be found closer to the base station. At large distances from the base station, the probability density function approaches zero, indicating that it is very unlikely to find the base station out there. For low RSSI, the function is spread out with almost uniform value at different distances, see FIG. 4. This implies that the low RSSI provides little specific knowledge of the mobile's location.

Since the signal propagation in the base to mobile and mobile to base directions goes through approximately the same path, the RSSI at the mobile station and the base station should indicate approximately the same distance except for the effects of co-channel interference and frequency selective Rayleigh fading. The effects of Rayleigh fading can be minimized by taking the average of multiple measurements. However, the base station and mobile station suffer from different levels of co-channel interference. In a dual mode mobile when mobile assisted hand-off is activated, RSSI from both the mobile and the base station are available. A combination of the two measurements adjusted for the difference in effective radiation power can be used to construct the location pdf. In an analog mode mobile, only the base station RSSI measurements are available.

The location pdf from a base station can be constructed from a signal strength survey of the surrounding area of the base station. Let $q_i(r,q)$ be the signal strength function of base station i in polar coordinates with the origin at the base station.

Figure 5:
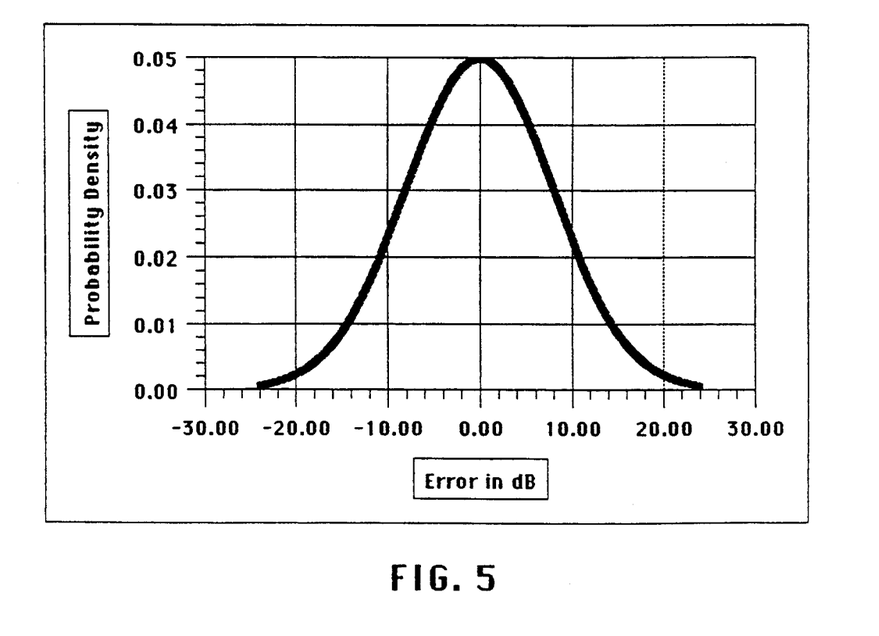
FIG. 5 illustrates the shape of an RSSI uncertainty function.

Let the uncertainty in measured signal strength due to Rayleigh fading, small scale variation in shadow losses and measurement inaccuracy be described by the error probability density function e(s), where s is the RSSI uncertainty in dB. In general e(s) is a bell shaped function as shown in FIG. 5.

Given a measured signal strength of $q_{i0}$ dB, either as a measurement from the base station alone or as a combination with the mobile measurement, the two-dimensional location pdf in polar coordinates can be expressed in the error probability density function and the signal strength function as:

$$u_i(r,\theta) = \frac{k_1 e_{RSSI}(q_i(r,\theta) - q_{i0})}{r} \quad (2)$$

where $k_1$ is a scaling constant and $q_i(r,\theta)$ and $q_{i0}$ are expressed in dBs. The 1/r factor arises from transforming the one-dimensional density to two-dimensional.

Transforming $u_i(r,\theta)$ into rectangular coordinates x,y which is common to all base stations gives $u_i(x\ y)$ for the ith base station.

Alternatively, the location pdf can be constructed without a map of the signal strength of the ith base station. The function $q(r,\theta)$ can be modeled by the inverse power law. Assuming an omni-directional antenna at the base station, received signal strength is independent of $\theta$ and is given by:

$$p = kr^{-\gamma} \quad (3)$$

where
p is the received signal power;
r is the distance between the transmitter and the receiver;
$\gamma$ is the propagation constant ranging from 2 to 4.5 depending on the particular propagation environment; and
k is a constant.
the received signal strength function $q_i(r,\theta)$ expressed in dB's is given by $$q_i(r,\theta) = -10\gamma \log(r) + k_2 \quad (4)$$

where $k_2$ is a constant. When the signal strength is approximated by the inverse power law, the received signal uncertainty $e_{RSSI}(s)$ is usually approximated by a log-Normal distribution function:

$$e_{RSSI}(S) = \frac{\exp - (s^2/\sigma^2)}{\sqrt{(2\pi\sigma^2)}} \quad (5)$$

where s is the received signal uncertainty in dBs and $\sigma$ is the standard deviation of the log-Normal distribution in dB's. Given a measured RSSI of $q_{i0}$, the location pdf $u_i(r,\theta)$ can be obtained by substituting equations (4) and (5) into (2), which gives $$u_i(r,\theta) = \frac{\exp - ((-10\gamma\log(r) + k_2 - q_{i0})^2/\sigma^2)}{r\sqrt{2\pi\sigma^2}} \quad (6)$$

If the base station has a sectorized transceiver antenna, equation (5) can be modified with the base antenna's directional response w(q) expressed in units of dBs as follows:

$$u_i(r,\theta) = \frac{\exp - ((-10\gamma\log(r) + k_2 + \omega(\theta) - q_{i0})^2/\sigma^2)}{r\sqrt{(2\pi\sigma^2)}} \quad (7)$$

In the case of generating the location pdf from a signal strength map, the map is usually obtained by a field measurement. Such measured signal strength map has already taken into account the antenna radiation pattern of the base station.

Figure 6:
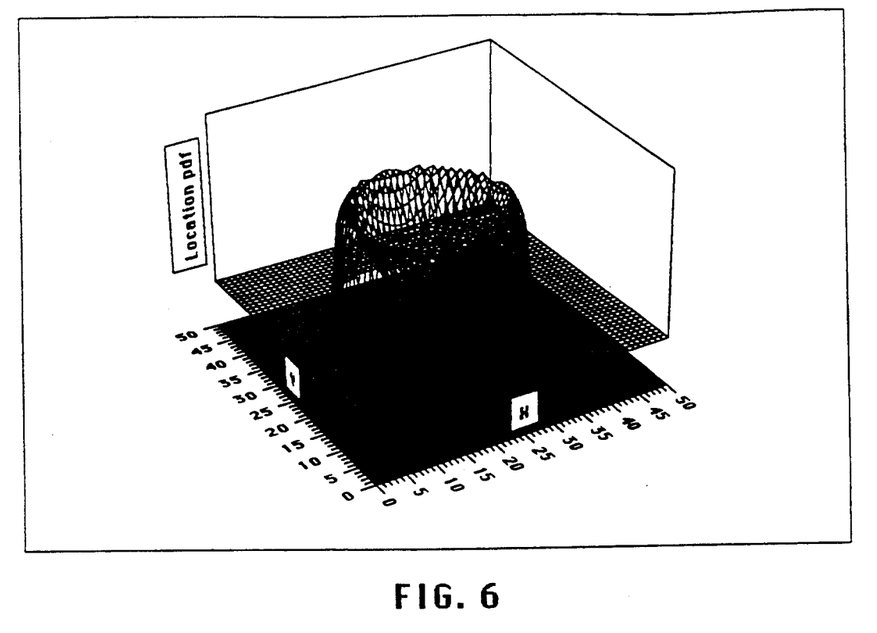
FIG. 6 illustrates the general shape of a location pdf obtained by delay measurement from a single base station.

The Location pdf using Propagation Delay can be constructed as follows:

The general shape of a location pdf based on propagation delay is different from that based on the signal strength in that the function has a rather sharp drop off beyond certain distance from a base station. Given a measured round trip propagation delay t, the probability of the mobile station locating much further than ct/2, where c is the electromagnetic wave propagation velocity, is very small. However, the probability of the mobile locating closer than ct/2 is significant because of indirect radio paths. The general shape of the pdf looks like a volcanic function with steep drop off on its outside walls as shown in FIG. 6.

If the round trip propagation delay function $\tau_i(r,q)$ is available for all the surrounding areas of cell i, the location pdf $u_i(r,q)$ can be constructed by following a procedure similar to that for the received signal strength measurement. Let $e_{DELAY}(t)$ be the probability density function of the inaccuracy in measuring the delay. For a measured propagation delay $\tau_{i0}$ of base station i, the location pdf is given by $$u_i(r,\theta) = \frac{k_3 e_{DELAY}(\tau_i(r,\theta) - \tau_{i0})}{r} \quad (8)$$

where $k_3$ is a scaling constant. The resulting pdf $u_i(r,q)$ can be transformed into the common rectangular coordinates $u_i(x,y)$ for constructing the joint location pdf u(x,y).

The joint probability density function can be constructed as follows:

Let there be N base stations within the range of the mobile station. For each base station within range of the mobile station, a two-dimensional probability density function is constructed as in section 4.1. Let $u_i(x,y)$ be the probability density function obtained between the mobile station and base station i. Assuming the radio parameter measurement results are independent in each base station, the joint probability density function $u(x,y)$ from N base stations can be obtained by simply taking the product of all the density functions. That is, the joint probability density function $u(x,y)$ is given by:

$$u(x,y) = k_4 \prod_{i=1}^{i=N} u_i(x,y) \qquad (9)$$

where $k_4$ is a scaling constant.

Figure 7A:
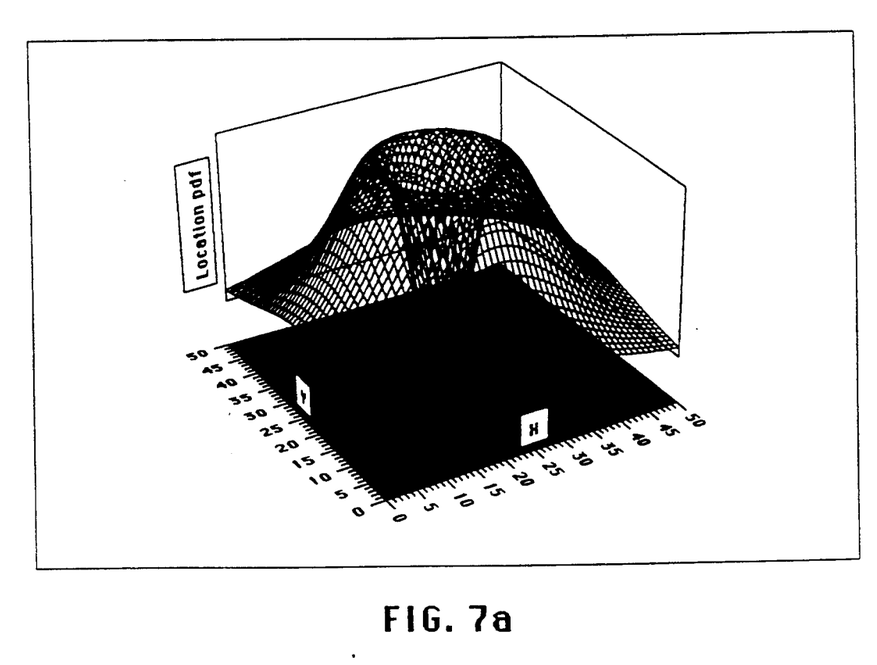
FIGS. 7a–d illustrate the shape of pdf from four (4) different base stations.
Figure 7B:
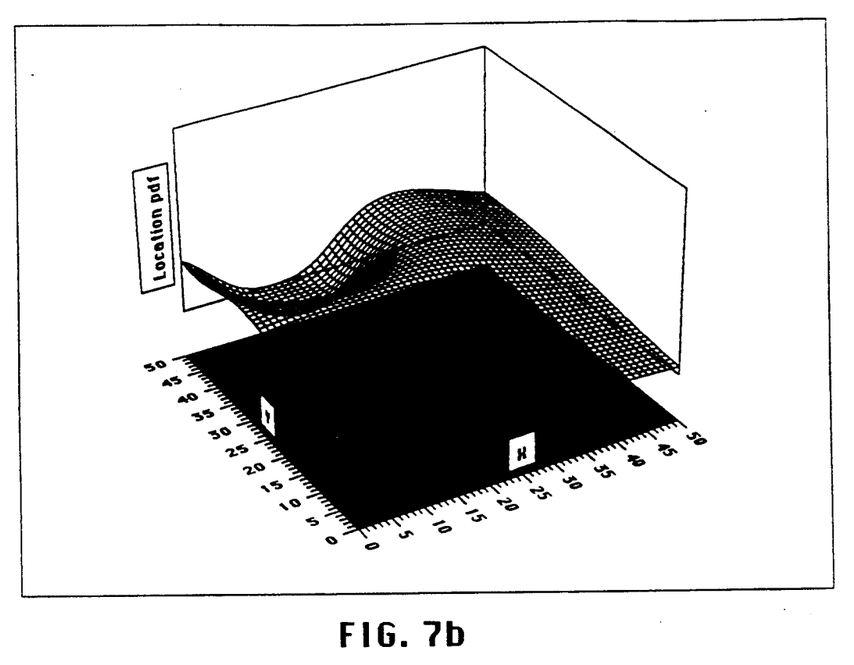
Figure 7C:
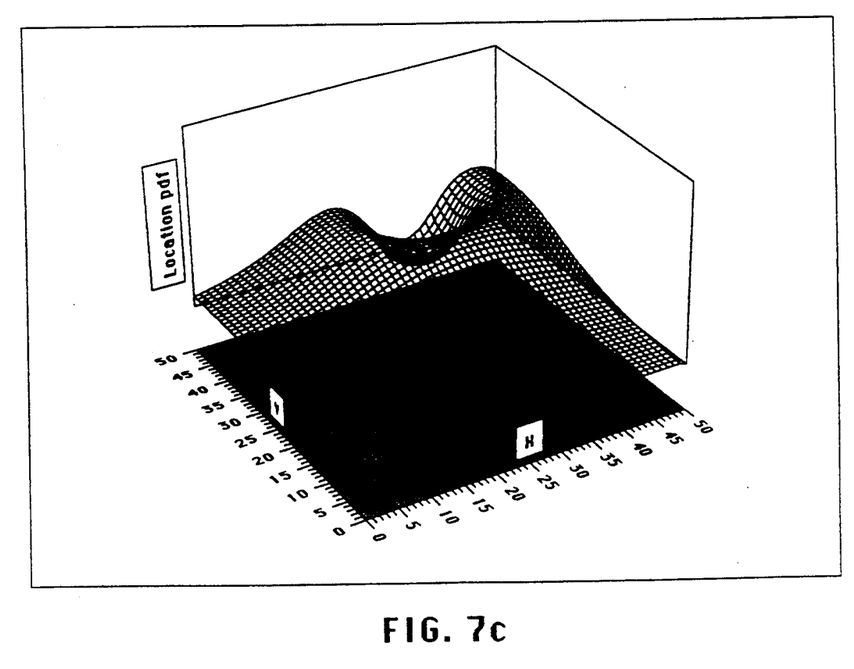
Figure 7D:
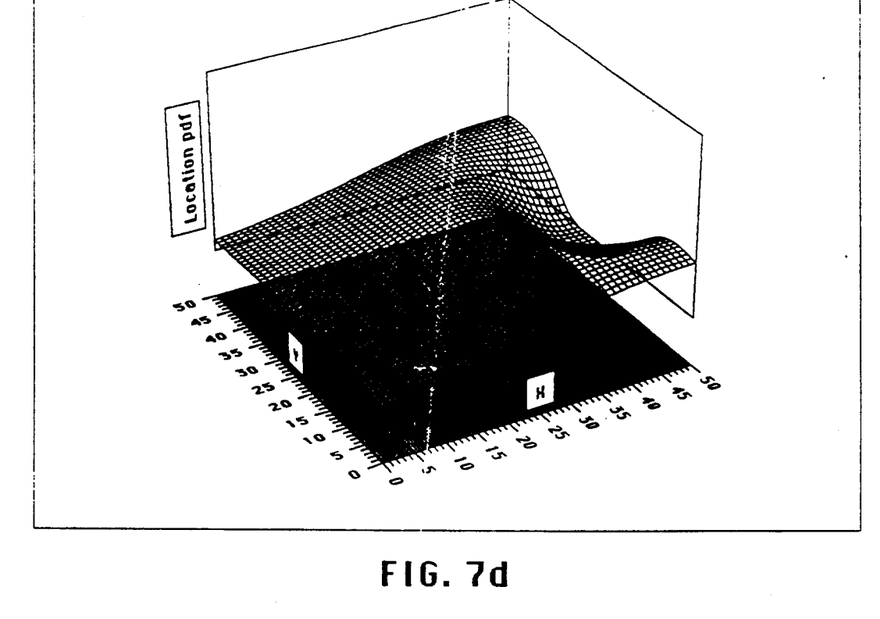
Figure 7E:
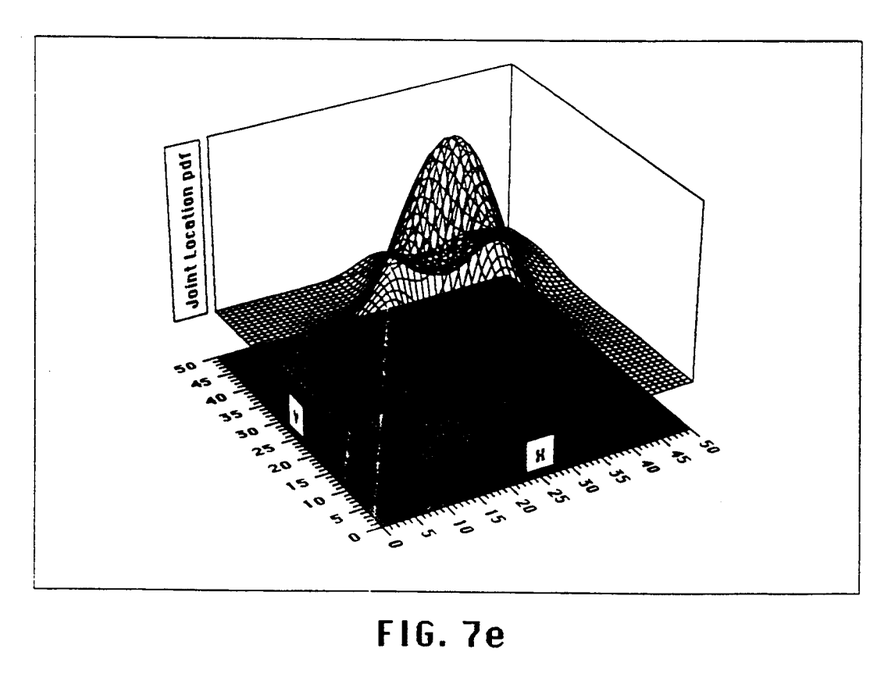
FIG. 7e illustrates the resulting joint pdf when combining the pdf of FIGS. 7a–d.

For example, FIGS. 7a to 7d show the probability density functions of the RSSI from four base stations. The resulting joint probability density function is shown in FIG. 7e and has a prominent peak.

Equation (9) shows one way of combining individual location pdf $u_i(x,y)$ to form the joint location pdf $u(x,y)$. However, it does not preclude the joint location pdf from being defined as a different combination of the individual location pdfs.

The location of a mobile station can be estimated from the joint location pdf alone or combining with the distribution of mobile station (vehicle) in the geographic area.

There are several methods of estimating the actual location from the joint pdf which are well known in probability theory. Estimating the mobile station location using the joint location pdf alone corresponds to maximum likelihood estimation. Given the joint pdf $u(x,y)$, the mobile's location can be estimated as the center of gravity of the function. Alternatively, the location can be estimated by simply taking the peak of $u(x,y)$.

In addition, the information from the joint or individual pdf can be combined with traffic distribution information from, say, a) mobiles located on streets or roads; and, b) pedestrian traffic patterns in the vicinity provided by portable or handheld units. In estimating the mobile location using traffic distribution, let the mobile traffic distribution function be $t(x,y)$. The x and y coordinates are the same rectangular coordinates as the $u(x,y)$. The $t(x,y)$ represents the probability density of finding a mobile station at coordinates $(x,y)$ given the known traffic pattern of the service area. The traffic density $t(x,y)$ may depend on the time of day, as rush hour traffic changes. The traffic pdf $t(x,y)$ is multiplied with the joint location pdf $u(x,y)$ to form $v(x,y)$:

$$v(x,y) = t(x,y)\, u(u,y)$$

The mobile station location can be estimated from $v(x,y)$ by finding the center of gravity or the peak of $v(x,y)$.

The location estimation method of the current invention can be applied to an area of arbitrary size which includes the estimated mobile location and within the cellular system service area. In some cases, if the system is confident that the mobile station to be located is within a small area, the location algorithm can be applied to a small area alone rather than the entire city, which greatly reduces the amount of processing for the estimation method.

I claim:

1. In a cellular communication system having a plurality of base station radios and mobile stations, a method of estimating the location of a mobile station being served by a first base station radio with respect to other base station radios, the method comprising the steps of:

a) transmitting a radio signal from said mobile station operating in said cellular communication system;
   b) receiving said transmitted radio signal from said mobile station at said first base station radio and at a second base station radio and at any other base station radios operating in said cellular communications system within the propagation range of said mobile station;
   c) measuring, for each received radio signal, radio propagation parameters associated with each of said base station radios;
   d) operating on at least one of the measured propagation parameters of each base station radio, to form a location probability density function (pdf) expressed as $$u_i(r,\theta) = \frac{ke(f_i(r,\theta) - f_{i0})}{r}$$

wherein k is a scaling constant, e is an error probability function, $f_i(r,\theta)$ is the signal propagation parameter function and $f_{i0}$ is a measured propagation parameter of base station i and r is the distance from the base station to the mobile;
   e) constructing a joint pdf by combining each individual pdf formed in step d;
   f) estimating, with respect to said base station radios, the location of the mobile station in said cellular communication system using the resulting joint probability density function.

2. A method as defined in claim 1, wherein the radio propagation parameters are measured by detecting the signal strength between the base station radios and the mobile station as $e_{RSSI}$, the signal propagation parameter function $f_i(r,\theta)$ is the signal strength function in dB of base station i in polar coordinates with the origin at the first base station, and the measured propagation parameter $f_{i0}$ is the measured signal strength in dB at base station i.

3. A method as defined in claim 2, further comprising the step of converting the two-dimensional location pdf $u_i(r,\theta)$ into a location pdf expressed in rectangular coordinates common to all base stations as $u_i(x,y)$.

4. A method as defined in claim 2, wherein the location density pdf is formed by modeling $f_i(r,\theta)$ using an inverse power law.

5. A method as defined in claim 1, wherein the radio propagation parameters are measured by detecting the propagation delay for a signal sent from the mobile station to each base station radio and the error probability function e is a probability density function of inaccuracies in measuring the delay and is expressed as $e_{DELAY}$, the signal propagation parameter function $f(r,\theta)$ is the round trip propagation delay function available for all surrounding areas of cell i, and the measured propagation parameter $f_{i0}$ is a measured propagation delay at base station i.

6. A method as defined in claim 5, further comprising the step of converting the two-dimensional location pdf $u_i(r,\theta)$ into a location pdf expressed in rectangular coordinates as $u_i(x,y)$.

7. A method as defined in claim 3, 4 or 6 wherein the joint probability density function is constructed by taking the product of all individual probability density functions.

8. A method as defined in claim 4, 5 or 8, wherein the joint probability function u(x,y) from N base stations is given by $$u(x,y) = k_4 \prod_{i=1}^{i=N} u_i(x,y)$$

wherein $u_i(x,y)$ is the probability density function obtained between the mobile station and the base station i and $k_4$ is a scaling constant.

9. A method as defined in claim 8, wherein the mobile station location is estimated by taking the peak value of u(x,y).

10. A method as defined in claim 8, wherein the mobile station location is estimated by taking the centroid of u(x,y).

11. A method as defined in claim 8, wherein the mobile station location is estimated by combining the joint probability density function u(x,y) with a mobile traffic distribution function t(x,y).

12. A method as defined in claim 11, wherein the joint probability density function u(x,y) and the mobile traffic distribution function t(x,y) are combined by multiplying t(x,y) and u(x:,y) to produce a pdf v(x,y).

13. A method as defined in claim 12, wherein the mobile station location is estimated by finding the peak value of v(x,y).

14. A method as defined in claim 12, wherein the mobile station location is estimated by finding the centroid of v(x,y).

* * * * *